April 17, 1945.    D. M. KNOX    2,373,964
LUBRICATED PLUG VALVE
Filed July 2, 1943
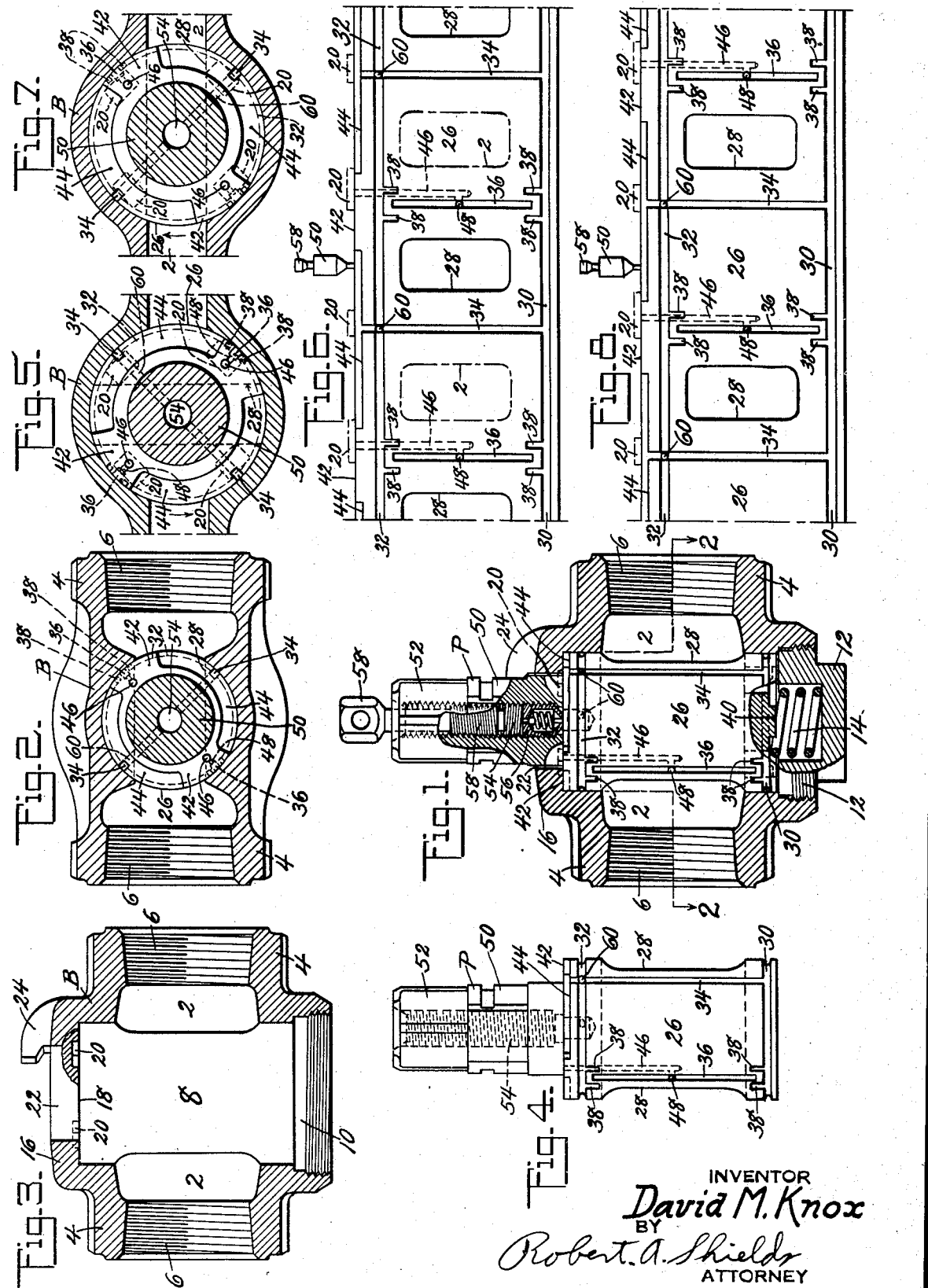
INVENTOR
David M. Knox
BY
Robert A. Shields
ATTORNEY Patented Apr. 17, 1945

2,373,964

UNITED STATES PATENT OFFICE 2,373,964

LUBRICATED PLUG VALVE

David M. Knox, New York, N. Y., assignor to American Car and Foundry Company, New York, N. Y., a corporation of New Jersey Application July 2, 1943, Serial No. 493,216

6 Claims. (Cl. 251—93)

This invention relates to valves in general and in particular to plug valves of the cylindrical lubricated type.

In the lubrication of valves it is necessary in order that the valve be fully lubricated by a groove system that certain of the grooves move past the body ports and thus be subjected to the action of the line fluid. This is true even in valves which are limited to a quarter turn or less. Since it is impossible to fully lubricate the valve without a lubricant supply groove being exposed, it is necessary that the grooves be arranged to prevent washout of the lubricant in the exposed groove and prevent escape of line fluid through the grooves from one side of the valve to the other. The escape of line fluid through the groove system, when possible, is commonly termed "blow-by." It is an object, therefore, of the present invention to provide a valve of the lubricated type in which the grooves are arranged to completely lubricate the seating surfaces both directly and by smearing of the lubricant on the seating surfaces.

A further object of the invention is the provision of a valve with lubricant grooves so arranged as to prevent any possibility of blow-by by fully isolating the exposed grooves.

A yet further object of the invention is the provision of a lubricated valve with a groove system so arranged as to provide a continuous smear of lubricant around the ports at all times.

These and other objects of the invention will be apparent to persons skilled in the art from a study of the following description and accompanying drawing, in which Figure 1 is a partial sectional view of the improved valve.

Fig. 2 is a sectional view taken substantially on line 2—2 of Fig. 1;

Fig. 3 is a sectional view of the valve body;

Fig. 4 is an elevational view of the improved plug;

Fig. 5 is a partial sectional view showing the valve in closed position;

Fig. 6 is a development of the seating surfaces of the closed valve;

Fig. 7 is a sectional view similar to Fig. 5 but showing the valve in open position, while Fig. 8 is a development of the seating surfaces of the open valve.

Referring now to the drawing in detail, it will be seen that the valve is constructed of two main parts, namely, a body B and a plug P. The body as shown in the figures, and particularly in Fig. 3, is preferably made in a single piece with a passageway 2 extending therethrough. The outer ends of the passageway are defined by flanges 4 internally threaded as at 6 to receive piping or other means for connecting the valve into a system. It is, of course, obvious that a bolting flange instead of a screw flange can be used. Extending substantially at right angles to the passageway 2 is a bore having the walls machined or otherwise treated to provide a seating surface 8 which, in the present case, is of cylindrical form interrupted by the passageway 2. The bottom end of the bore is counter-bored as at 10 and threaded to receive a cap 12 centrally recessed to accommodate compression spring 14. The upper or head end of the bore is partially closed by head flanges 16, the inner parts of which are carefully machined or otherwise finished to provide a body head seating surface 18. As clearly shown, this head seating surface 18 lies in a plane substantially normal to the planes defining the cylindrical seating surface 8. Also, as clearly shown, the head seating surface is interrupted as at 20 by small diametrically opposed cavities extending upwardly into the head flange 16. The head seating surface of the body is also interrupted by a hole 22 adapted to receive the stem of the plug later to be described. A stop 24 is formed integral with the head flange and overlaps the hole 22 for the purpose of restricting rotation of the plug to a quarter turn.

The plug P, as clearly shown, is of cylindrical form and is carefully machined or otherwise treated to provide a cylindrical plug seating surface 26. This cylindrical seating surface of the plug is interrupted by a through passageway 28 of a cross-sectional area approximately equal to the cross-section area of the passageway 2 of the body. The plug seating surface is also interrupted by a continuous bottom circumferential groove 30 and a top circumferential groove 32, these grooves being disposed above and below the bottom and top edges of the plug respectively to provide normally uninterrupted seating surfaces beneath and above the grooves. The cylindrical seating surface is also interrupted by relatively long diametrically opposed longitudinal grooves 34 and relatively short diametrically opposed longitudinal grooves 36. The grooves 34, together with circumferential grooves 30 and 32, will provide a complete groove frame surrounding the passageway 28 of the plug. As clearly shown, particularly in Figs. 4, 6 and 8, the comparatively short longitudinal grooves 36 do not intersect circumferential grooves 30 and 32 and with this arrangement there would be a possibility of an S leak in the valve. Such an S leak is effectively prevented by extending stub grooves 38 upwardly and downwardly respectively from circumferential grooves 30 and 32. These stub grooves are arranged on either side of and overlap the grooves 36 forming in effect a cap over the ends of the short longitudinal grooves. Due to the overlap of the grooves 36 and 38 lubricant will be effectively smeared over the seating surfaces during movement of the plug and any leakage of the valve will be prevented. In this manner a complete smear of lubricant on the seating surfaces at all times and fully surrounding the ports is insured. The bottom end of the plug is machined or otherwise finished to provide a spring centering plug 40 and a seat adapted to rest upon the compression spring 14 which will urge the plug upwardly toward the head of the body. The upper or head end of the plug is carefully machined or otherwise finished to provide a plug head seating surface or land 42. This plug head seating surface or land 42 is interrupted by segmental grooves 44 forming part of an annulus. These segmental grooves are positioned adjacent the edge of the head seating surface and consequently interrupt the cylindrical seating surface 26 of the plug adjacent the upper ends thereof. The solid portions of the head seating surface intermediate the ends of segmental grooves 44 are interrupted by vertically extending holes 46 extending downwardly from the head seating surface to approximately the center of short longitudinal grooves 36. Connection between short longitudinal grooves 36 and holes 46 is established by short radially directed holes 48 extending from the bottom of grooves 36 into the holes 46. As clearly shown, the holes 46 are diametrically opposed and so located as to register with cavities 20 in the head portion of the body when the valve is in either the full open or full closed positions. Extending upwardly from the head seating surface of the plug is a stem 50 having wrench-receiving portion 52 and an axial bore 54. The axial bore is threaded to receive a check valve assembly 56 and a screw or ram 58. Rotation of the screw or ram will apply pressure to lubricant inserted in the bore 54. Lubricant under pressure in axial bore 54 is fed to the groove system by means of radial holes 60 extending from the bottom of grooves 34 and 32 at the points of intersection thereof into the axial bore 54.

From the preceding description of the groove system it will be seen that lubricant under pressure in bore 54 may flow radially outwardly through holes 60. From the outer ends of these holes the lubricant may spread in either direction to fill top circumferential groove 32. It may also flow downwardly in long longitudinal grooves 34 to fill the bottom circumferential groove 30. Filling of circumferential grooves 30 and 32 will also cause filling of the capping stub grooves 38. Lubricant from holes 60 can also flow upwardly in longitudinal grooves 34 to fill the segmental grooves 44 which interrupt the head seating surface of the plug. As clearly shown in Figs. 5 and 7, the ends of the segmental grooves 44 are of such a length and so positioned that each at least partially overlaps two of the cavities 20 formed in the head portion of the body and accordingly lubricant can flow from the segmental grooves 44 into cavities 20. From the cavities 20 lubricant can flow downwardly in holes 46 and outwardly through short holes 48 to fill the relatively short longitudinal grooves 36. In this manner all lubricant grooves can be fully filled when the valve is in the full open or full closed position. When, however, the plug is turned in the body one end at least of each segmental groove moves out of register with the cavity in the head flange of the body and accordingly lubricant cannot be supplied to such cavities nor to grooves 36. During continued turning of the plug the upper ends of holes 46 interrupting the head seating surface or land 42 of the plug will move out of register with cavities 20 and will only register with the next adjacent cavity after the plug has been turned to either the full open or full closed position. Thus it will be seen that holes 46, 48 and grooves 36 will be at times fully isolated from the remainder of the lubricant system and any washout that may occur when groove 36 is exposed to line fluid cannot extend into the remainder of the system. Since the grooves 36 are fully isolated at the times when exposed, it is impossible for a blow-by to occur. With the grooves fully lubricated, rotation of the plug will cause lubricant to be smeared over the cylindrical seating surfaces 8 and 26 and over the head seating surfaces 18 and 42, thus effectively sealing the valve against head leaks or S leaks or blow-by which might occur if grooves 36 were not fully isolated each from the other and from the remainder of the system.

While the valve has been described more or less in detail with specific reference to a cylindrical type of plug it will be obvious that the groove arrangement and lubricating system could be applied equally well to a tapered type of plug valve. It will also be obvious that various modifications and rearrangements of parts other than those shown and described may be made and all such modifications are contemplated as will fall within the scope of the appended claims defining my invention.

What is claimed is:

1. In a lubricated valve the combination of a valve body having a passageway therethrough for the flow of matter, a bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a valve plug rotatably mounted in said bore and having the side and at least parts of one end finished to provide respectively plug and plug head seating surfaces, a passageway extending through the valve plug and adapted to register with said body passageway for flow of matter when said valve is in full open position, circumferential grooves interrupting said plug seating surface adjacent the upper and lower ends thereof, spaced segmental grooves located at the head end of the plug and reducing the area of said plug and plug head seating surfaces, longitudinal grooves interrupting the plug seating surface and connecting each segmental groove to each circumferential groove, additional longitudinal grooves interrupting the plug seating surface between said longitudinal and circumferential grooves and free of direct connection therewith, a source of lubricant pressure carried by the plug, means for supplying lubricant under pressure from said source to said longitudinal, circumferential and segmental grooves as well as to said cavities, and means connected to said additional longitudinal grooves for supplying lubricant under pressure thereto only when said valve is in substantially full open or closed position.

2. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, circumferential grooves interrupting said plug seating surface adjacent the upper and lower ends thereof, spaced segmental grooves located at the head end of the plug and reducing the area of said plug and plug head seating surfaces, longitudinal grooves interrupting the plug seating surface and connecting each segmental groove to each circumferential groove, additional longitudinal grooves interrupting the plug seating surface between said longitudinal and circumferential grooves and free of direct connection therewith, a source of lubricant pressure carried by the plug, means for supplying lubricant under pressure from said source to said longitudinal, circumferential and segmental grooves as well as to said cavities, and means connected to said additional longitudinal grooves for supplying lubricant under pressure thereto only when said valve is in substantially full open or closed position, said means including a hole in the plug interrupting the plug head seating surface between the ends of said segmental grooves.

3. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, spaced segmental grooves located at the upper end of the plug and reducing the area of said plug and plug head seating surfaces, a first set of longitudinal grooves interrupting the plug seating surface and connected to said segmental grooves, a second set of longitudinal grooves interrupting the plug seating surface intermediate said first set but free of connection therewith, a source of lubricant pressure carried by the plug, means for supplying lubricant under pressure from said source to said first set of longitudinal grooves and to the segmental grooves and cavities, and additional means for supplying lubricant to said second set of longitudinal grooves only at predetermined positions of the valve.

4. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, spaced segmental grooves located at the head end of the plug and being overlapped by said cavities and reducing the area of said plug and plug head seating surfaces, a first set of longitudinal grooves interrupting the plug seating surface and connected to said segmental grooves, a second set of longitudinal grooves interrupting the plug seating surface intermediate said first set but free of connection therewith, a source of lubricant pressure carried by the plug, means for supplying lubricant under pressure from said source to said first set of longitudinal grooves and to the segmental grooves and cavities, and passageways formed in said plug and connected with said second set of longitudinal grooves, said passageways having their upper ends interrupting the plug head seating surface between the ends of said segmental grooves and registering with certain of said cavities when said valve is in substantially full open or closed position.

5. In a lubricated valve the combination of a valve body having a passageway therethrough for the flow of matter, a bore formed in the body and having its axis substantially normal to the axis of said passageway and its walls finished to provide a body seating surface, a body head portion at least partially closing one end of said bore and internally finished to provide a body head seating surface, a valve plug rotatably mounted in said bore and having the side and at least parts of one end finished to provide respectively plug and plug head seating surfaces, a passageway extending through the valve plug and adapted to register with said body passageway for flow of matter when said valve is in full open position, circumferential grooves interrupting said plug seating surface adjacent the upper and lower ends thereof, spaced segmental grooves located at the upper end of the plug and reducing the area of said plug and plug head seating surfaces, longitudinal grooves interrupting the plug seating surface and connecting each segmental groove to each circumferential groove, a source of lubricant pressure carried by the plug, means for supplying lubricant under pressure from said source to all of said grooves and at all times, additional longitudinal grooves interrupting the plug seating surface between said longitudinal and circumferential grooves and free of direct connection therewith, a plurality of opposed longitudinally extending stub grooves located adjacent the ends of said additional longitudinally extending grooves and directly connected to said circumferential grooves in order to smear lubricant over the body seating surfaces both above and below the body passageway during rotation of the plug in the bore, and additional means connected to said additional longitudinal grooves for supplying lubricant under pressure thereto only when said valve is in substantially full open or closed position.

6. In a lubricated valve the combination of a valve body having a passageway therethrough for the flow of matter, a bore formed in the body and having its axis substantially normal to the axis of said passageway and its walls finished to provide a body seating surface, a body head portion at least partially closing one end of said bore and internally finished to provide a body head seating surface, a valve plug rotatably mounted in said bore and having the side and at least parts of one end finished to provide respectively plug and plug head seating surfaces, a passageway extending through the valve plug and adapted to register with said body passageway for flow of matter when said valve is in full open position, circumferential grooves interrupting said plug seating surface adjacent the upper and lower ends thereof, spaced segmental grooves located at the upper end of the plug and reducing the area of said plug and plug head seating surfaces, longitudinal grooves interrupting the plug seating surface and connecting each segmental groove to each circumferential groove, a source of lubricant pressure carried by the plug, means for supplying lubricant under pressure from said source to all of said grooves and at all times, additional longitudinal grooves interrupting the plug seating surface between said longitudinal and circumferential grooves and free of direct connection therewith, a plurality of longitudinally extending stub grooves located on either side of said additional longitudinally extending grooves at the ends thereof and being connected to said circumferential grooves to smear lubricant over the body seating surfaces above and below the body passageway during rotation of the plug in the bore, and additional means connected to said additional longitudinal grooves for supplying lubricant under pressure thereto only when said valve is in substantially full open or closed position.

DAVID M. KNOX.